United States Patent [19]
Wincn

[11] Patent Number: 5,694,427
[45] Date of Patent: Dec. 2, 1997

[54] PSEUDO-AUI LINE DRIVER AND RECEIVER CELLS FOR ETHERNET APPLICATIONS

[75] Inventor: John Michael Wincn, Cupertino, Calif.

[73] Assignee: Advanced Micro Devices Inc., Sunnyvale, Calif.

[21] Appl. No.: 391,911

[22] Filed: Feb. 21, 1995

[51] Int. Cl.⁶ .................................................. H04B 3/00
[52] U.S. Cl. .......................................... 375/257; 330/255
[58] Field of Search ...................... 375/257, 318, 375/351, 295, 316, 317, 259; 45/218, 212, 220; 330/252, 255, 262, 273

[56] References Cited

U.S. PATENT DOCUMENTS

| | | | |
|---|---|---|---|
| 4,097,859 | 6/1978 | Looschen | 375/257 |
| 4,486,671 | 12/1984 | Ong . | |
| 4,612,466 | 9/1986 | Stewart | 327/437 |
| 4,760,282 | 7/1988 | Kuo et al. | 326/90 |
| 4,845,388 | 7/1989 | Amatangelo . | |
| 4,852,164 | 7/1989 | Suzuki | 380/15 |
| 5,179,577 | 1/1993 | Ilyadis | 455/219 |
| 5,287,386 | 2/1994 | Wade et al. | 375/257 |
| 5,296,758 | 3/1994 | Sandhu | 326/21 |
| 5,327,465 | 7/1994 | Wincn et al. | 375/351 |
| 5,365,123 | 11/1994 | Nakase et al. . | |
| 5,444,740 | 8/1995 | Mizukani et al. | 375/257 |
| 5,513,370 | 4/1996 | Paul | 370/85.3 |

FOREIGN PATENT DOCUMENTS

| | | |
|---|---|---|
| 0 442 618 A1 | 8/1991 | European Pat. Off. . |
| 57-7037928 | 3/1982 | Japan . |
| 01228219 | 9/1989 | Japan . |

OTHER PUBLICATIONS

Robert F. Coughlin et al. "Operational Amplifiers and Linear Integrated Circuits," Prentice Hall, pp. 194–204, 1991.
Allen, P.E., et al., "CMOS Analog Circuit Design," *Holt Reinhard & Winston*, 1987.

*Primary Examiner*—Tesfaldet Bocure
*Attorney, Agent, or Firm*—Townsend and Townsend and Crew LLP

[57] ABSTRACT

A single-ended differential AUI line driver, and complementary single-ended differential AUI line receiver, implement a pseudo AUI that exhibits most of the characteristics of an IEEE 802.3 standard compatible AUI line driver. The pseudo AUI line driver permits multi-point to single point connection (wire-ORing) of multiple line drivers and receivers to support port mobility on a per-port basis.

23 Claims, 4 Drawing Sheets

5,694,427

PSEUDO-AUI LINE DRIVER AND RECEIVER CELLS FOR ETHERNET APPLICATIONS

CROSS-REFERENCE TO RELATED APPLICATIONS

Related to "MEDIUM ATTACHMENT UNIT FOR USE WITH TWISTED PAIR LOCAL AREA NETWORK," U.S. Pat. No. 5,164,960, "APPARATUS AND METHOD FOR SELECTIVELY STORING ERROR STATISTICS," U.S. patent application Ser. No. 08/337,635, "PROGRAMMABLE SOURCE ADDRESS LOCKING MECHANISM FOR SECURE NETWORKS," U.S. patent application Ser. No. 08/337,634, "MEDIA ATTACHMENT UNIT MANAGEMENT INTERFACE," U.S. patent application Ser. No. 08/338,015, "PROGRAMMABLE ADDRESS MAPPING MATRIX FOR SECURE NETWORKS," U.S. patent application Ser. No. 08/366,809, "PROGRAMMABLE DELAY OF DISRUPT FOR SECURE NETWORKS," U.S. patent application Ser. No. 08/366,808, "PROGRAMMABLE DISRUPT OF MULTICAST PACKETS FOR SECURE NETWORKS", U.S. patent application Ser. No. 08/366,806, and "PROGRAMMABLE PACKET SAMPLING FOR NETWORK MANAGEMENT," U.S. patent application Ser. No. 08/376,153, all hereby expressly incorporated by reference for all purposes.

BACKGROUND OF THE INVENTION

The present invention relates generally to Medium Attachment Units ("MAU") of a Local Area Network ("LAN") and more specifically to an improved attachment unit interface (AUI) to provide for port mobility.

The incorporated patent describes a set of inventions that relate to devices that facilitate implementation of local area networks. It is one aspect of those disclosures to describe implementation of IEEE standards 802.3 and 10 Base T in integrated semiconductor devices, both standards hereby expressly incorporated by reference for all purposes. These documents include a description of an attachment unit interface (AUI) used in one common implementation of a carrier sense, multiple access/collision detection (CSMA/CD) network protocol. One common implementation of this CSMA/CD protocol is the well-known ETHERNET protocol.

LAN management is becoming increasingly important as a size, and attendant complexity, of the individual networks continue to grow. To permit versatility, yet retain advantages associated with integrating electronics into semiconductor structures, integrated repeater devices used preferably have two components. One component is a managed repeater controller device that provides repeater state machine and management functions, according to the IEEE 802.3 standard. The other component is a number of transceiver devices having media dependent interfaces. Preferably, each transceiver device incorporates several nodes, for example anywhere from 4-12, or more, per integrated device.

The controller device has a total number of ports corresponding to the aggregate number of nodes provided by the sum of the transceiver devices coupled to it. In prior devices, the interface to each node of each transceiver was implemented by use of an AUI. The IEEE 802.3 standard strictly defines the operational and electrical characteristics of this interface. Some of the relevant characteristics of the AUI are that signals on the AUI be fully differential signals, provided on single-point to single-point connections. Full implementation of an AUI requires six pins per port or node. These requirements interfere with efficient implementations of port mobility.

Port mobility refers to a feature of a hub (having one or more repeater controllers) that allows it to connect a particular node to any of several backplanes or collision domains. There are many well-known reasons to desire to implement port mobility in a LAN. Unfortunately, existing implementations of a standard ETHERNET network require relatively expensive and complex solutions to implement rudimentary port mobility features. Ideally, port mobility is implemented on a per-port basis, allowing any individual port to be moved to any available backplane, entirely under software control.

SUMMARY OF THE INVENTION

The present invention provides apparatus and method for simply, efficiently and economically providing for an AUI line driver that exhibits most characteristics of an IEEE 802.3 standard compatible AUI line driver, but provides for a single-ended output. The single-ended output permits single-point to multi-point connections (wire ORing) of line drivers to support port mobility on a per port basis. The driver cells and receiver cells implementing the present invention also offer the advantage of taking up smaller die area than standard cells, and have high bandwidth operation which helps reduce pulse jitter in packets transmitted on the network.

According to a preferred embodiment, the pseudo AUI line driver includes two source followers, a pull-up driver and a pull-down driver wherein the source followers act as low impedance voltage sources that clamp the output voltage to improve rise and fall time of the output. Performance is maintained when the output is loaded with large external capacitance.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

DESCRIPTION OF THE PREFERRED EMBODIMENT

Figure 1:
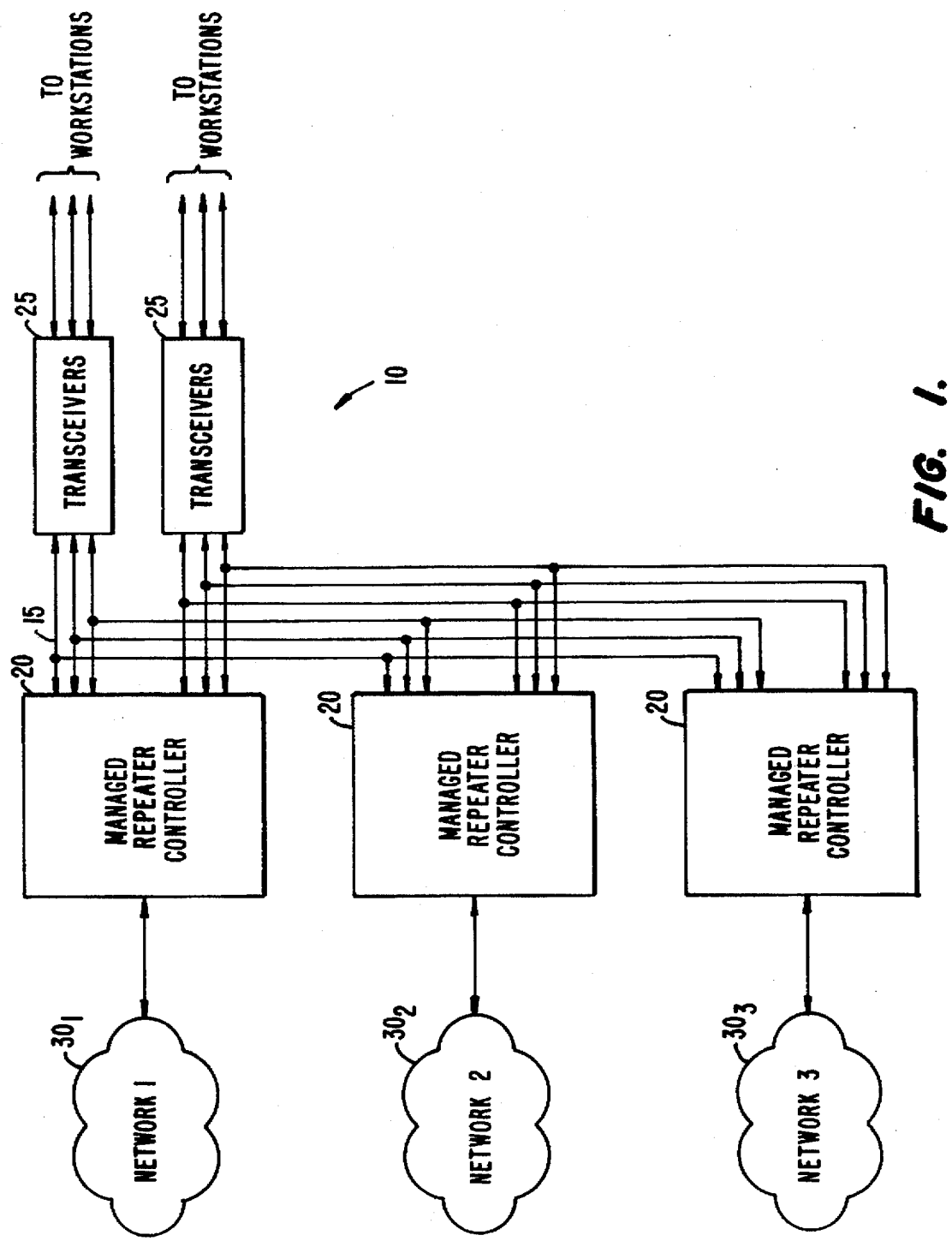
FIG. 1 is a block diagram illustrating one implementation of a LAN architecture using a pseudo-AUI to achieve port mobility.

FIG. 1 is a block diagram illustrating one implementation of a LAN architecture 10 using a pseudo-AUI 15 to achieve port mobility. LAN architecture 10 includes a plurality of managed repeater controllers 20, each coupled to a plurality of transceivers 25. Each repeater controller 20 is coupled to a different network, or backplane, $30_i$, i=1 to 3.

Each transceiver 25 provides for a media dependent interface, such as those that correspond to 10BASET or 10BASE2, for example. Each transceiver 25 incorporates a number of nodes, one coupled to a workstation, or other data terminal equipment (DTE) (not shown). Transceiver 25 may incorporate from one to six, or more, nodes per package, with six being the preferred embodiment. Each repeater controller 20 in the preferred embodiment includes twelve nodes per device, requiring two transceivers 25 to fully enable all the nodes. FIG. 1 illustrates a system wherein each transceiver 25 incorporates three ports and a repeater controller 20 includes six nodes total.

The IEEE 802.3 standard requires six signal lines per node of repeater 20 (and correspondingly per port of transceiver 25) to transport three differential signals. These differential signals include a Data Out (DO) signal, a Data In (DI) signal, and a Control In (CI) signal. Conventional implementation requires seventy-two signal lines, and therefore, seventy-two pins, to implement a simple repeater having one repeater controller 20 and two transceivers 25 for 12 ports.

In LAN 10, each port of transceiver 25 is coupled to corresponding nodes of each repeater controller 20 via pseudo-AUI 15. This single-point to multi-point connection is not provided for in the IEEE 802.3 standard. Additionally, each connection is made using a single conductor to carry a single-ended differential signal between repeater controllers 20 and transceivers 25. Details regarding implementation of a pseudo-AUI driver cell and a pseudo-AUI receiver cell are set forth more thoroughly below.

Figure 2:
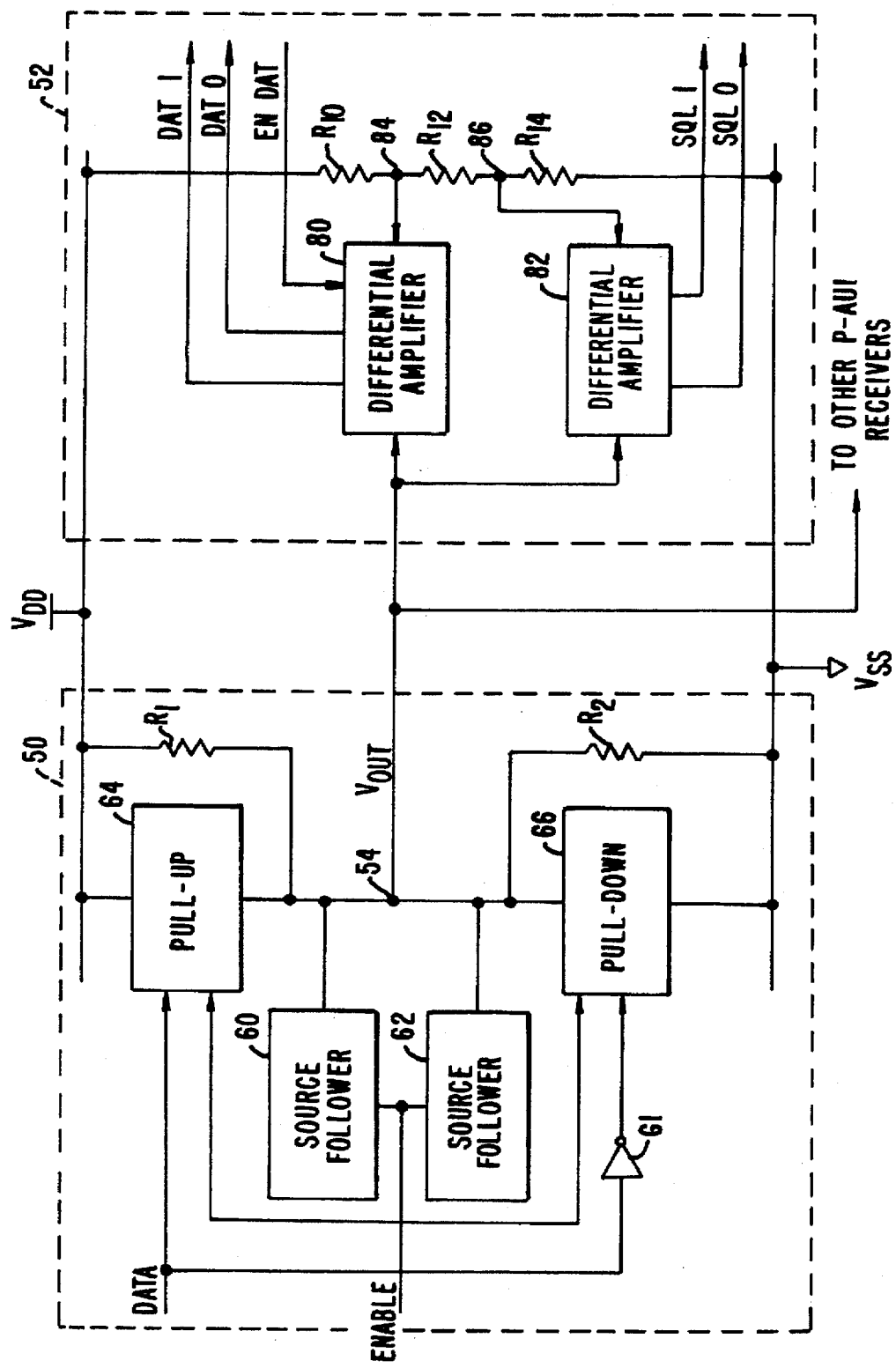
FIG. 2 is a block diagram of preferred embodiment for a pseudo-AUI driver and pseudo-AUI receiver integrated on a single circuit board.

FIG. 2 is a block diagram of preferred embodiment for a pseudo-AUI driver cell 50 and a pseudo-AUI receiver cell 52 to implement pseudo-AUI 15 shown in FIG. 1. Driver cell 50 drives a single-ended differential output voltage $V_{OUT}$ at a node 54 in response to a DATA signal. Driver cell 50 includes a first source follower 60, a second source follower 62, a pull-up driver/load 64, a pull-down driver/load 66, two resistors ($R_1$ and $R_2$), and an inverter G1.

Source follower 60 and source follower 62 each have an output coupled to node 54 and an input for receipt of an ENABLE signal. Each source follower includes self-biasing that is referenced to both a first voltage reference ($V_{DD}$) and a second voltage reference ($V_{SS}$), to collectively set and limit an output range of $V_{OUT}$. For source follower 60, the self-biasing is set to inhibit $V_{OUT}$ from raising above a preselected high-level. In the case of source follower 62, the self-biasing is set to inhibit $V_{OUT}$ from falling below a preselected low-level. The source followers are responsive to a deassertion of the ENABLE signal to turn off.

Pull-up driver 64 is responsive to the DATA signal and the ENABLE signal to couple node 54 to the first reference voltage when the DATA signal and the ENABLE signal are concurrently asserted. Deassertion of either signal decouples the first reference voltage from node 54.

Inverter G1 has an input for receiving the DATA signal, and an output coupled to pull-down driver 66, wherein inverter G1 provides an inverted DATA signal. Pull-down driver 66 is responsive to the inverted DATA signal and to the ENABLE signal to couple node 54 to the second reference voltage when the inverted DATA signal and the ENABLE signal are concurrently asserted. Deassertion of the ENABLE signal or assertion of the DATA signal decouples the second reference voltage from node 54.

Resistor R1 couples the first reference voltage to node 54, and resistor R2 couples the second reference voltage to node 54. When the ENABLE signal is deasserted, resistor R1 and R2 form a voltage divider that sets $V_{OUT}$ at node 54 to a predetermined level. In the preferred embodiment, resistor R1 and resistor R2 are equal. With the first voltage reference $V_{DD}$ set to about five volts and the second voltage reference set to about zero volts, $V_{OUT}$ is set to about two and one-half volts when driver cell 50 is not enabled.

In the preferred embodiment, source follower 60 is self-biased to limit $V_{OUT}$ to about 0.8 volts above mid-supply. Source follower 66 is self-biased to limit $V_{OUT}$ to about 0.8 volts below mid-supply. Thus, the output range of $V_{OUT}$ is referenced to mid-supply and has a voltage range of about 1.6 volts.

It will be appreciated that for other embodiments, the voltage reference levels and self-bias levels may be different. There are a few considerations to take into account when setting these various levels. One factor is the estimated amount of load capacitance that will be presented to $V_{OUT}$ and that will be driven by driver cell 50. Because driver cell 50 is expected to operate satisfactorily in a single-point to multi-point configuration (a situation characterized by relatively large load capacitance) with a relatively short run length in the preferred embodiment, the run length being several inches. The preferred embodiment was designed to operate when the load capacitance approaches 100 pf. Reducing the voltage range of $V_{OUT}$ results in consumption of less power than when a larger voltage range is permitted. Additionally, the IEEE 802.3 standard specifies a similar voltage range, so using the preferred voltage range facilitates backward compatibility with existing transceivers that do not use receiver cell 52.

A further consideration is the bandwidth requirements of the cells. The IEEE 802.3 standard specifies a maximum amount of jitter that can be introduced by devices transmitting packets on the network. Devices and sub-systems having fast rise and fall times, requiring high bandwidth, introduce less jitter than slower devices. A side benefit is that the reduced voltage range for $V_{OUT}$ further reduces power requirements when considering the relatively short rise and fall times of $V_{OUT}$.

To summarize the operation, when enabled (ENABLE is asserted), pull-up driver 64 responds to an assertion of the DATA signal to quickly raise $V_{OUT}$ from about mid-supply (2.5 volts) to about 3.3 volts. When the DATA signal is deasserted, pull-up driver 64 turns off and pull-down driver 66 quickly decreases $V_{OUT}$ to about 1.7 volts. As long as the ENABLE signal is asserted, pull-up driver 64 and pull-down driver 66 drive $V_{OUT}$ to one of the reference voltages, limited by the self-bias levels set on the source followers. When the ENABLE signal is deasserted, the source followers (60 and 62), pull-up driver 64 and pull-down driver 66 are turned off. Turning off the active devices allows resistor R1 and resistor R2 to cause $V_{OUT}$ to settle to mid-supply.

Receiver cell 52 includes two differential amplifiers (data amplifier 80 and squelch amplifier 82) and three resistors (R10, R12, and R14). Data amplifier 80 has two data inputs, a first input coupled to node 54 to receive $V_{OUT}$. A second input is coupled to a first reference voltage node 84 biased at Vref1. Data amplifier 80 includes a data enable (EN__DAT) signal input. Data amplifier 80 compares $V_{OUT}$ to Vref1, and drives a first fully differential output (DAT__1 and DAT__0) in well-known fashion, depending upon the result of the comparison and the state of the EN__DAT signal. If EN__DAT is deasserted, data amplifier is inhibited from driving DAT__1 and DAT__0. Assertion of the EN__DAT signal enables data amplifier 80.

Squelch amplifier 82 provides information for amplitude squelch qualification. Squelch amplifier 82 has two inputs, a first input coupled to node 54. A second input is coupled to a second reference voltage node 86 biased at Vref2. Squelch amplifier 82 compares $V_{OUT}$ to Vref2, and drives a second fully differential output (SQL_and SQL_0). The SQL signal is used by a controller, not shown, that asserts EN_DAT when data amplifier 80 is to be enabled. Part of the decision regarding whether to enable data amplifier 80 is whether SQL is asserted or not.

It is a feature of the differential amplifiers used in the preferred embodiment to translate the voltage levels appearing on $V_{OUT}$ to CMOS voltage levels. As further shown in FIG. 4, each differential amplifier is a two stage amplifier, a first stage for detecting and amplifying input differential signals, and a second stage for translating the voltage levels from the AUI levels to CMOS voltage levels.

Series-connected resistor R10, resistor R12 and resistor R14 provide a voltage divider to establish Vref1 and Vref2. Resistor R10 couples first reference voltage node 84 to the same first voltage reference ($V_{DD}$) used by driver cell 50. Resistor R12 couples first voltage reference node 84 to second voltage reference node 86. Resistor R14 couples second voltage reference node 86 to the same second reference voltage ($V_{SS}$) used by driver cell 50.

In the preferred embodiment, resistance values for resistor R10, resistor R12, and resistor R14 are chosen so that Vref1 is about equal to mid-supply (2.5 volts) and Vref2 is about 225 mV lower than mid-supply. 225 mV was selected to conform to standard AUI requirements, but other embodiments may have other threshold values.

In the preferred embodiment, it is expected that driver cell 50 is integrated into a first device installed onto a component sub-system, such as a printed wiring board (PWB), and receiver cell 54 is integrated into a second device installed onto the same component sub-system. The pseudo AUI 15, shown in FIG. 1, connects the first and second devices together. This has the double advantage of allowing the same power supply voltages to bias driver cell 50 and receiver cell 52 (and thereby reduce false signal indications due to supply variations), and to minimize a length of conductors coupling $V_{OUT}$ to the differential amplifiers in receiver cell 52.

One reason the short run-lengths offer an advantage is that the IEEE 802.3 standard specifies a minimum jitter requirement, part of which is accounted for by a jitter allowance allocated to a the AUI (which can have a maximum length of about 50 meters). Reducing the length of the pseudo AUI allows the jitter allowance for the very long cable run of the standard AUI to be split and incorporated into driver cell 50 and receiver cell 52, thereby increasing their respective jitter budgets.

In operation, receiver cell 52 monitors $V_{OUT}$ and compares it to both Vref1 and Vref2. When $V_{OUT}$ falls to a level less than about 225 mV below mid-supply, squelch amplifier 82 asserts the SQL data signal. The IEEE 802.3 standard requires this amplitude squelch check, to help ensure that minimal noise levels on the AUI line will not be transmitted onto the network as data. Data amplifier 80 responds to changes in $V_{OUT}$ that cause $V_{OUT}$ to vary from the mid-supply reference level. When EN_DAT is asserted, voltage levels above or below mid-supply are reflected in the DAT_1 and DAT_0 signals.

The SQL signal is used to help determine whether the EN_DAT signal is to be asserted or not.

Figure 3:
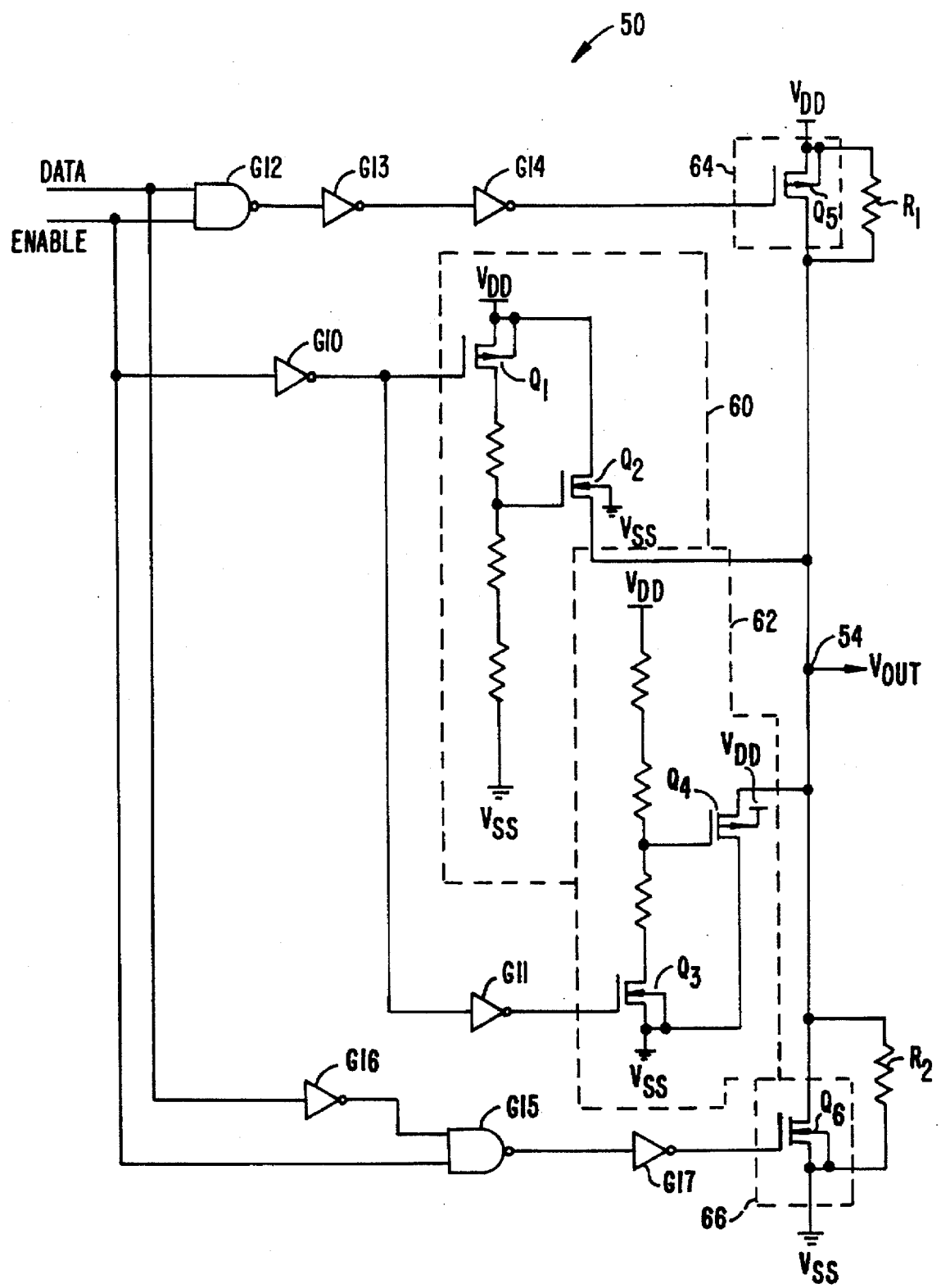
FIG. 3 is a detailed schematic diagram of a preferred embodiment for the pseudo-AUI driver.

FIG. 3 is a detailed schematic diagram of a preferred embodiment for pseudo-AUI driver cell 50 shown in FIG. 2. Source follower 60 is implemented as a resistor string coupled between a drain of a PMOS transistor Q1, having a source coupled to $V_{DD}$, and $V_{SS}$. The resistor string sets an appropriate bias reference voltage for a gate of an NMOS transistor Q2. Note that in the preferred embodiment, the resistor string includes three resistors. Other embodiments may be a different configuration and have a different number of resistors. Transistor Q2 has a drain coupled to $V_{DD}$ and a source coupled to node 54, the output node. Controlling a gate voltage of transistor Q1 selectively enables and disables source follower 60. For example, an inverter G10 has an input for receiving the ENABLE signal, and an output coupled to the gate of transistor Q1.

Source follower 62 is implemented as a second resistor string coupled between a drain of an NMOS transistor Q3, having a source coupled to $V_{SS}$, and $V_{DD}$. The second resistor string sets an appropriate bias reference voltage for a gate of a PMOS transistor Q4. Transistor Q4 has a drain coupled to $V_{SS}$ and a source coupled to node 54, the output node. Controlling a gate voltage of transistor Q3 selectively enables and disables source follower 62. For example, an inverter G11 has an input for receiving an inverted ENABLE signal from the output of inverter G10, and an output coupled to the gate of transistor Q3.

Pull-up driver 64 is implemented as a PMOS transistor Q5 having a drain coupled to node 54, a source coupled to $V_{DD}$, and a gate for receiving a control voltage. When the control voltage is low, a binary zero, pull-up driver 64 is on. A dual-input NAND gate G12 and two inverters (G13 and G14) provide the logic control of the control voltage. Specifically, the ENABLE signal is provided to one input of NAND gate G12, and the DATA signal is provided to the other input of NAND gate G12. An input of inverter G13 is coupled to an output of NAND gate G12, and an input of inverter G14 is coupled in turn to an output of inverter G13. An output of inverter G14 provides the control voltage for the gate of transistor Q5.

Pull-down driver 66 is implemented as an NMOS transistor Q6 having a drain coupled to node 54, a source coupled to $V_{SS}$, and a gate for receiving a second control voltage. When the second control voltage is high, a binary one, pull-down driver 66 is on. A dual-input NAND gate G15 and two inverters (G16 and G17) provide the logic control of the second control voltage. Specifically, the ENABLE signal is provided to one input of NAND gate G15. The DATA signal is provided to an input of inverter G16, with an output of inverter G16 coupled to the other input of NAND gate G15. An input of inverter G17 is coupled to an output of NAND gate G12. An output of inverter G17 provides the second control voltage for the gate of transistor Q6.

Figure 4:
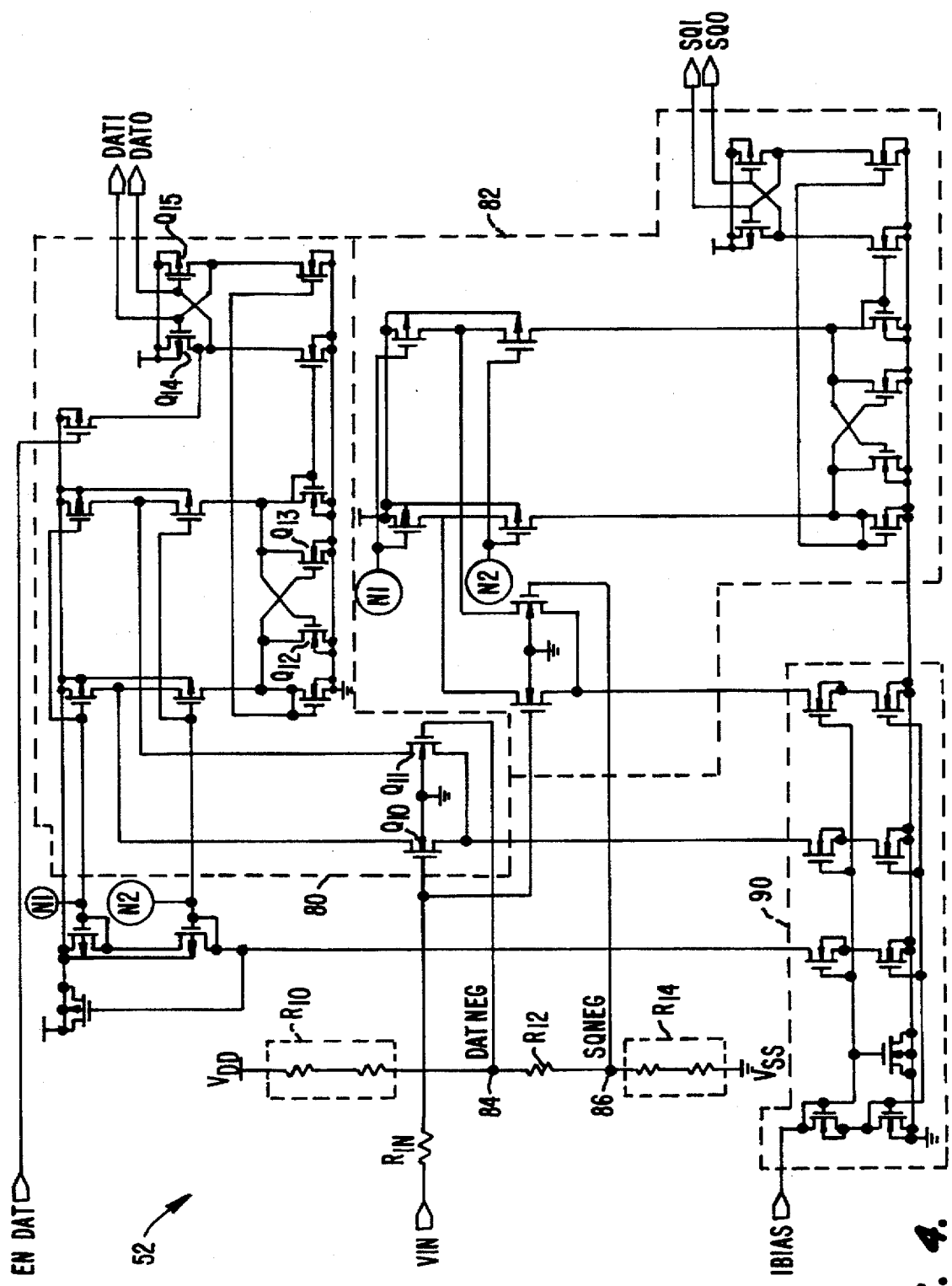
FIG. 4 is a detailed schematic diagram of a preferred embodiment for the pseudo-AUI receiver.

FIG. 4 is a detailed schematic diagram of a preferred embodiment for pseudo-AUI receiver cell 52 shown in FIG. 2. The preferred embodiment includes a bias controller 90, as well as an input resistor $R_{IN}$ disposed between node 54 shown in FIG. 2 and the first differential input of the differential amplifiers. Data amplifier 80, and squelch amplifier 82 are each implemented as a folded cascode differential amplifier having two stages: an input stage and a conversion stage.

The input stage includes two NMOS transistors having source terminals coupled to each other and to bias controller 90. A gate of transistor Q10 provides the first differential input and is coupled, through resistor $R_{IN}$, to node 54 shown in FIG. 2. A gate of transistor Q11 provides the second differential input and is coupled to node 84. To improve performance, a substrate of transistor Q10 and of transistor Q11 are each coupled to VSS. A drain of transistor Q10 and a drain of transistor Q11 are coupled to a remainder of the first stage. Further details regarding implementation of a folded cascode differential amplifier will not be further described herein. For further information regarding design of differential amplifiers there are many references. For example, two references are Nakamura, Carley; "An Enhanced Fully Differential Folded-Cascode Opamp", IEEE JSSC Vol 27, No 4, April 92, pp 563–567 and Vallee, El-Masry, "A Very High Frequency CMOS Complementary Folded-Cascode Opamp", IEEE JSSC Vol 29, No 2, February 94, pp 130–133, both hereby expressly incorporated by reference for all purposes.

Certain design factors that were implemented to improve a bandwidth of the differential amplifiers include use of two pairs of cross-coupled transistors. Specifically, NMOS transistor Q12 and NMOS transistor Q13, and PMOS transistor Q14 and PMOS transistor Q15 provide positive feedback to enhance switching speed of the first stage, and the second stage, respectively.

Squelch amplifier 82 is implemented identically to data amplifier 80, except that the second differential input is coupled to node 86 rather than node 84.

In conclusion, the present invention provides a simple, efficient solution to a problem of providing per port mobility. Use of a single-ended differential pseudo AUI line driver cell, and complementary pseudo AUI line receiver cell, according to the present invention permits a single point to multi-point AUI. Thus, one set of transceivers can be coupled to each of a plurality of backplanes through repeater controller devices dedicated to each backplane. While the above is a complete description of the preferred embodiments of the invention, various alternatives, modifications, and equivalents may be used. For example, the preferred embodiment uses MOSFET devices, though other implementations may use exclusively bipolar transistors, or a combination of bipolar transistors and MOSFET devices. Still other transistor technologies may be employed, depending upon a particular application. Therefore, the above description should not be taken as limiting the scope of the invention which is defined by the appended claims.

What is claimed is:

1. A single-ended attachment unit interface (AUI) driver, comprising:
    a first source follower, coupled to an output port and responsive to a first reference voltage, for clamping a magnitude of an output voltage at said output port from rising above about a first voltage level;
    a second source follower, coupled to said output port and responsive to a second reference voltage, for clamping said magnitude of said output voltage from falling below about a second voltage level;
    a pull-up driver, coupled to said output port and responsive to a data signal, for actively driving said output voltage to said first reference voltage when said data signal is asserted; and
    a pull-down driver, coupled to said output port and responsive to said data signal, for actively driving said output voltage to said second reference voltage when said data signal is deasserted.

2. The AUI driver of claim 1 wherein said source followers, said pull-up driver and said pull-down driver are responsive to a deassertion of an enable signal to inhibit their operation in an idle mode and further comprising:
    a first impedance coupled between said first voltage reference and said output port; and
    a second impedance coupled between said output port and said second voltage reference.

3. The AUI driver of claim 2 wherein said first and second impedances are about equal to each other.

4. The AUI driver of claim 2 wherein said source followers, said pull-up driver and said pull-down driver each consist essentially of metal-oxide semiconductor field-effect transistors (MOSFETs).

5. The AUI driver of claim 4 wherein said first source follower and said pull-up driver are p-channel MOSFETs.

6. The AUI driver of claim 5 wherein said second source follower and said pull-down driver are n-channel MOSFETs.

7. The AUI driver of claim 6 wherein said output voltage has a range of about 1.6 volts peak-to-peak, wherein said first voltage reference is about five volts, and wherein said second voltage reference is about zero volts.

8. The AUI driver of claim 6 wherein said output voltage has a range of about twice the peak AUI signal.

9. The AUI driver of claim 8 wherein said peak AUI signal level is about 0.8 volts.

10. The AUI receiver of claim 9 wherein said second impedance comprises a third impedance coupled between a reference node and said second input, and a fourth impedance coupled between said reference node and said second voltage reference, and further comprising:
    a second amplifier, having a first input coupled to said input port and a second input coupled to said reference node, for generating an amplitude squelch signal when said input single-ended data signal falls below an amplitude reference voltage level at said reference node.

11. A single-ended attachment unit interface (AUI) receiver, comprising:
    a differential amplifier having a first input coupled to an input port for receiving a single-ended data signal referenced to a particular voltage reference between a first voltage reference and a second voltage reference, and having a second input coupled to a reference voltage, for generating a differential data signal from said single-ended data signal; and
    a self-bias reference circuit, coupled to said second input and to said particular voltage reference, for generating said reference voltage from said particular voltage reference, wherein said self-bias reference circuit comprises:
        a first impedance coupled between said second input and said first voltage reference; and
        a second impedance coupled between said second input and said second voltage reference.

12. The AUI receiver of claim 11 wherein said differential amplifier comprises a folded cascode differential amplifier.

13. The AUI receiver of claim 11 wherein said single-ended differential signal has a first voltage range less than a difference between said first voltage reference and said second voltage reference, and wherein said differential amplifier further comprises:
    a wideband first stage for detecting differential changes between said single-ended differential signal and said reference voltage to generate a first and a second differential signal having a second voltage range less than said difference between said voltage references; and
    a level converting second stage, coupled to an output of said first stage, for converting said second voltage range to about equal said difference between said voltage references.

14. The AUI receiver of claim 13 wherein said first voltage range is about 1.6 volts.

15. The AUI receiver of claim 14 wherein said difference between said first and said second voltage references is about five volts.

16. The AUI receiver of claim 11 wherein said second impedance comprises a third impedance coupled between a reference node and said second input, and a fourth impedance coupled between said reference node and said second voltage reference, and further comprising:

a second differential amplifier, having a first input coupled to said input port and a second input coupled to said reference node, for generating a differential amplitude squelch signal when said single-ended data signal falls below an amplitude reference voltage level at said reference node.

17. A data transmission system, comprising:

a single-ended attachment unit interface (AUI) driver for driving a single-ended data signal at an output port, including:

a first source follower, coupled to said output port and responsive to a first reference voltage, for clamping a magnitude of an output voltage at said output port from rising above about a first voltage level;

a second source follower, coupled to said output port and responsive to a second reference voltage, for clamping said magnitude of said output voltage from falling below about a second voltage level;

a pull-up driver, coupled to said output port and responsive to a data signal, for actively driving said output voltage to said first reference voltage when said data signal is asserted; and a pull-down driver, coupled to said output port and responsive to said data signal, for actively driving said output voltage to said second reference voltage when said data signal is deasserted; and a single-ended AUI receiver coupled to said single-ended AUI driver, including:

a differential amplifier having a first input coupled to said output port for receiving said single-ended data signal referenced to a particular voltage reference between said first voltage reference and said second voltage reference, and having a second input coupled to a reference voltage, for generating a differential data signal from said single-ended data signal; and a self-bias reference circuit, coupled to said second input and to said particular voltage reference, for generating said reference voltage from said particular voltage reference.

18. The data transmission system of claim 17 further comprising:

a second AUI receiver coupled to said output port of said AUI driver.

19. The data transmission system of claim 18 wherein said AUI driver and said first and said second AUI receiver are each coupled to a single circuit board.

20. The data transmission system of claim 17 wherein said source followers, said pull-up driver and said pull-down driver are responsive to a deassertion of an enable signal to inhibit their operation in an idle mode and further comprising:

a first impedance coupled between said first voltage reference and said output port; and a second impedance coupled between said output port and said second voltage reference.

21. The data transmission system of claim 20 further comprising:

a second AUI receiver coupled to said output port of said AUI driver.

22. The data transmission system of claim 21 wherein said AUI driver and said first and said second AUI receiver are each coupled to a single circuit board.

23. A data transmission system, comprising:

a single-ended attachment unit interface (AUI) driver for driving a single-ended data signal at an output port, including:

a first source follower, coupled to said output port and responsive to a first reference voltage, for clamping a magnitude of an output voltage at said output port from rising above about a first voltage level;

a second source follower, coupled to said output port and responsive to a second reference voltage, for clamping said magnitude of said output voltage from falling below about a second voltage level;

a pull-up driver, coupled to said output port and responsive to a data signal, for actively driving said output voltage to said first reference voltage when said data signal is asserted; and a pull-down driver, coupled to said output port and responsive to said data signal, for actively driving said output voltage to said second reference voltage when said data signal is deasserted; and a single-ended AUI receiver coupled to said single-ended AUI driver, including:

an amplifier having a first input coupled to said output port for receiving said single-ended data signal referenced to a particular voltage reference between said first voltage reference and said second voltage reference, and having a second input coupled to a reference voltage, for generating an output data signal from said single-ended data signal; and a self-bias reference circuit, coupled to said second input and to said particular voltage reference, for generating said reference voltage from said particular voltage reference.

* * * * *

UNITED STATES PATENT AND TRADEMARK OFFICE
CERTIFICATE OF CORRECTION

PATENT NO. : 5,694,427

DATED : December 2, 1997

INVENTOR(S) : John Michael Wincn

It is certified that error appears in the above-identified patent and that said Letters Patent is hereby corrected as shown below:

In column 8, line 49, delete "differential".

In column 8, line 54, delete "differential".

Signed and Sealed this

Seventh Day of April, 1998

Attest:

BRUCE LEHMAN

Attesting Officer

Commissioner of Patents and Trademarks